United States Patent [19]

Cherry

[11] Patent Number: 4,915,437
[45] Date of Patent: Apr. 10, 1990

[54] TOOL TRAY

[76] Inventor: Kim Cherry, P.O. Box 4364, Boise, Id. 83711

[21] Appl. No.: 328,879

[22] Filed: Mar. 27, 1989

[51] Int. Cl.$^4$ .............................................. B60R 11/06
[52] U.S. Cl. ................................. 296/37.6; 224/42.41;
224/42.42; 312/DIG. 3; 312/333; 108/44; 211/151
[58] Field of Search ................................. 296/26, 37.6;
224/42.23, 42.41–42.44; 312/DIG. 33, 333;
108/44; 211/151

[56] References Cited

U.S. PATENT DOCUMENTS

| 120,645 | 11/1971 | Holt | 224/42.41 |
|---|---|---|---|
| 2,784,027 | 3/1957 | Temp | 296/37.6 X |
| 3,606,112 | 9/1971 | Cheshier | 224/42.44 |
| 3,682,360 | 8/1972 | Fletcher et al. | 224/42.23 X |
| 4,305,695 | 12/1981 | Zachrich | 296/37.1 X |
| 4,573,731 | 3/1986 | Knaack et al. | 296/37.6 |
| 4,676,415 | 6/1987 | Kennedy | 224/42.43 X |
| 4,681,360 | 7/1987 | Peters et al. | 296/37.6 |
| 4,705,315 | 11/1987 | Cherry | 296/37.1 |

FOREIGN PATENT DOCUMENTS 8500733  2/1985  PCT Int'l Appl. ................. 296/37.6

*Primary Examiner*—Dennis H. Pedder
*Attorney, Agent, or Firm*—Frank J. Dykas; Craig M. Korfanta

[57] ABSTRACT

A tool tray 10 which is attachable to the underside of a flatbed utility truck 1 and slidably supported by a pair of receiving channels 19 and 20 which are attached to the underside of a flatbed.

Tool tray 10 is constructed from a rectangular frame having a pair of side members 11 and 12 and a pair of end members 13 and 14 which define the front and back ends. A rectangular bottom panel 15 is welded to the lower edges of side and end members thereby constructing a tray. A first pair of rollers 16 are each attached toward the back end of each side member and are disposed toward the upper edges of their respective side members to engage the upper lips of receiving channels 19 and 20. Likewise, a second pair of rollers 17 are disposed on respective side members toward the lower edges of the side members to engage the lower lips of the receiving channels 19 and 20.

A rod 21 is provided and is rotatably attached substantially along the length of left side member 12. Rod 21 has a plurality of stop dogs 23, each having a V-shaped notch, radially aligned and attached for engaging retaining dog 24 which is attached to the adjacent receiving channel 20. Handle 25 is attached to an extending end of rod 21 for imparting an axial rotation thereto.

4 Claims, 5 Drawing Sheets

TOOL TRAY

BACKGROUND OF THE INVENTION

1. Technical Field

This invention generally relates to a slidable storage container for use on utility vehicles such as flatbeds, and more particularly to a slidable storage container which utilizes the space between the rear axle and bed of a flatbed truck.

2. Background Art

Several slidable storage containers are known for use with pickup type trucks. One such device is taught by Temp, U.S. Pat. No. 2,784,027, which teaches a drawer unit which is attached to the top side of the pickup bed and includes a false floor for protecting the drawer from cargo carried in the pickup bed. The drawer of Temp slides coplanarly outward of the pickup bed from the tailgate end. Temp also teaches a hinged leg depending from the extended end of the drawer to support the drawer when in an extended position.

Unfortunately, the device of Temp has two drawbacks when adapted for use as a tool carrier. First, the device of Temp attaches to the top side of the pickup bed, thereby raising the effective bed to an undesirably high level. Secondly, the drawer cannot be extended during transit and must have additional support when in an extended positioned.

Knaack, et al., U.S. Pat. No. 4,573,731, teaches a very similar drawer type storage unit to that of the device of Temp. Knaack teaches a false floor which is raised above the bed of the pickup. Again, the drawer is not capable of maintaining an open position during transit.

Cherry, U.S. Pat. No. 4,705,315, teaches a slidable storage container for use in the cargo space of a trade van. The storage container is mounted on a telescoping extension track which permits the operator to fully extract the storage container through the open cargo doors. Obviously, this device is not suited for attachment to the underside of a flatbed utility truck. Additionally, this device is not capable of maintaining an extended position during transit.

Zachrich, U.S. Pat. No. 4,305,695, teaches a rollout tray for use with panel trucks. The device of Zachrich is very similar to those of Temp and Knaack; however, Zachrich does not teach a false floor or raised bed. Additionally, the device of Zachrich is not capable of remaining in an extended position while in transit and must be supported at its extending end.

What is needed is a tool tray which is attachable to the underside of the bed of a utility truck, so as not to use valuable bed space, and further which is capable of remaining in an extended position during transit and does not require weight supporting members at its extended end.

Accordingly, it is the object of the present invention to provide such a slidable container for use with flatbed utility type trucks.

DISCLOSURE OF INVENTION

These and other objects are accomplished by the use of a slidable tool tray which is attachable to the underside of a flatbed utility truck. The tool tray is slidably supported by a pair of receiving channels which are attached to the underside of flatbed. Some flatbeds are equipped with parallel frame members which are sturdy enough to support the point loads associated with the present tool tray; therefore, additional receiving channels are not necessary.

The tool tray is constructed from a rectangular frame having a pair of side members which define the elongated length of the tray and a pair of end members which define the front and back ends. A rectangular bottom panel is attached to the lower edges of the side and end members, thereby constructing a tray or drawer. A first pair of rollers are each attached to the back end on respective side members and are disposed toward the upper edges of the side members to engage the upper lip of the receiving channels. Likewise, a second pair of rollers are disposed on respective side members toward the lower edges of the side members to engage the lower lip of the receiving channels. The rod has a plurality of stop dogs each having a V-shaped notch and being radially aligned and attached for engaging a retaining dog which is attached to the adjacent receiving channel. A handle is attached to an extending end of the rod for rotating the dogs in and out of engagement with the retaining dog. A handle stop is attached to the front end to provide a stop for the handle for limiting the rotation of the rod in one direction. The stop dogs serve as the rotation limiter for the rod in the opposite direction.

In use the tray can be extended to a plurality of positions whereby one of the stop dogs engages the retaining dog on the adjacent receiving channel. The tray can be fully or partially extended and is capable of supporting heavy loads, e.g. machinery and the like, not only when the vehicle is stationary, but also during transit.

BEST MODE FOR CARRYING OUT INVENTION

Figure 1:
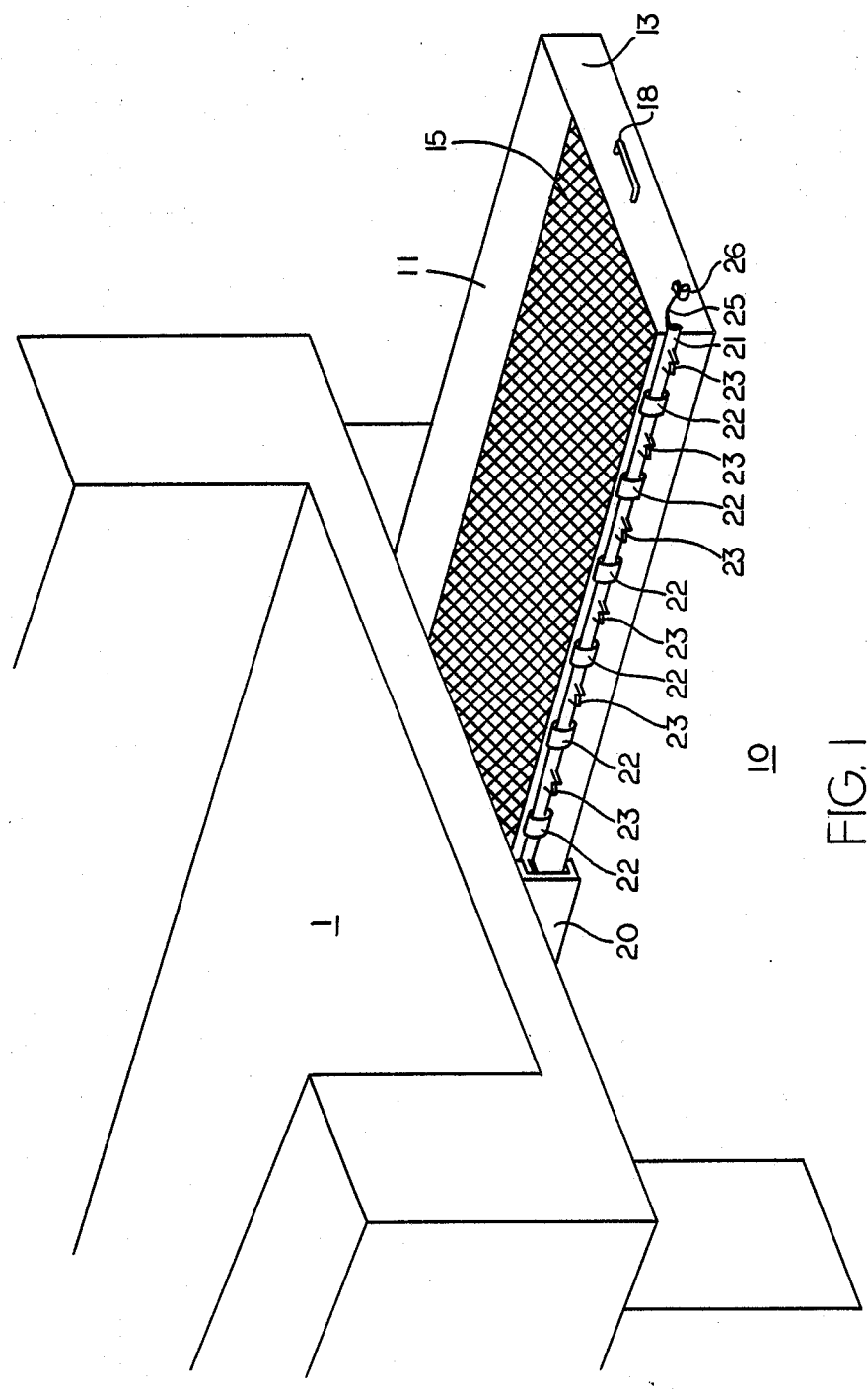
FIG. 1 is a three-quarter representational view of a flatbed truck having a tool tray installed thereon.
Figure 2:
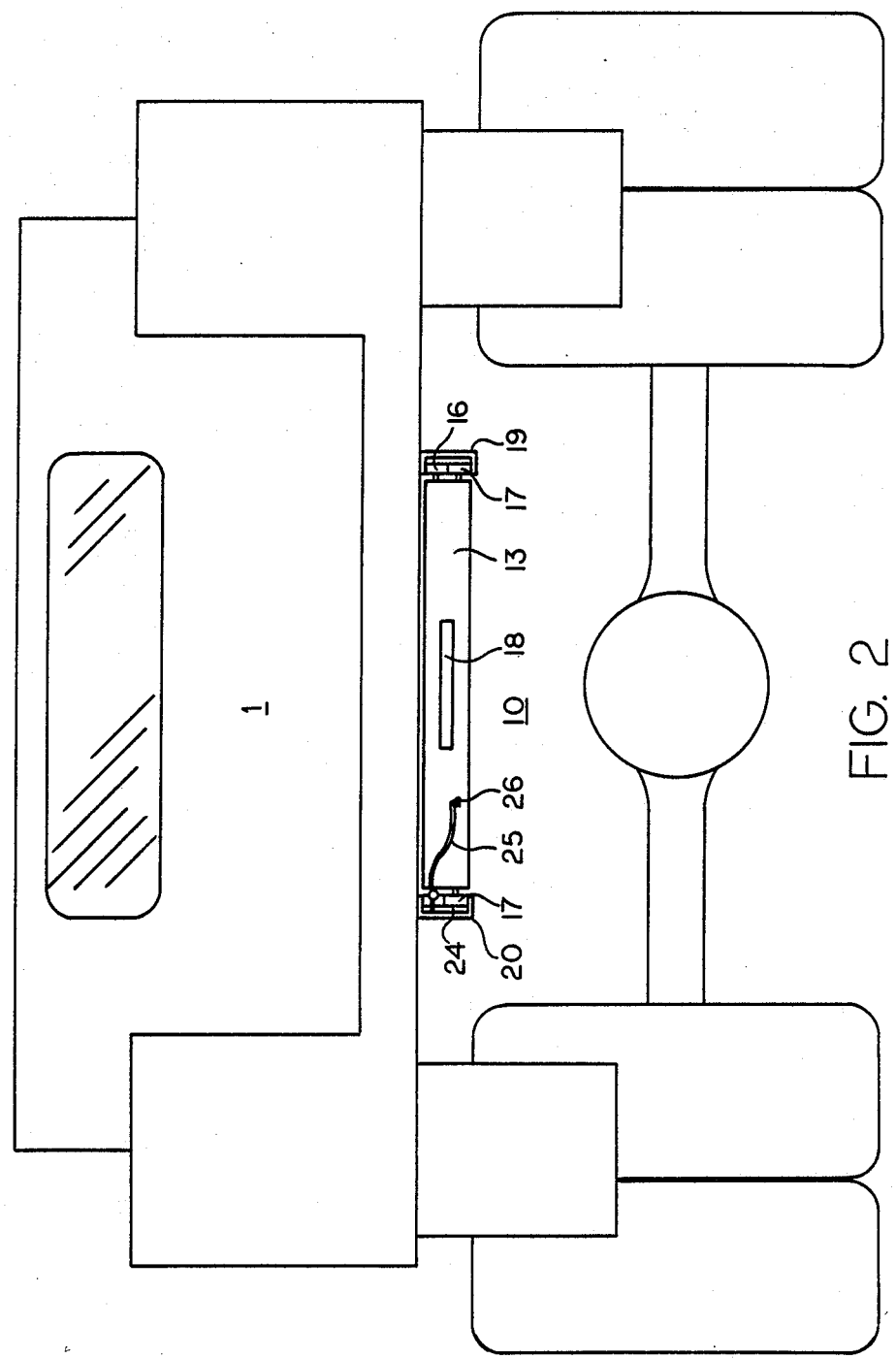
FIG. 2 is a front plan view of the tool tray showing the flatbed utility vehicle from the rear.
Figure 3:
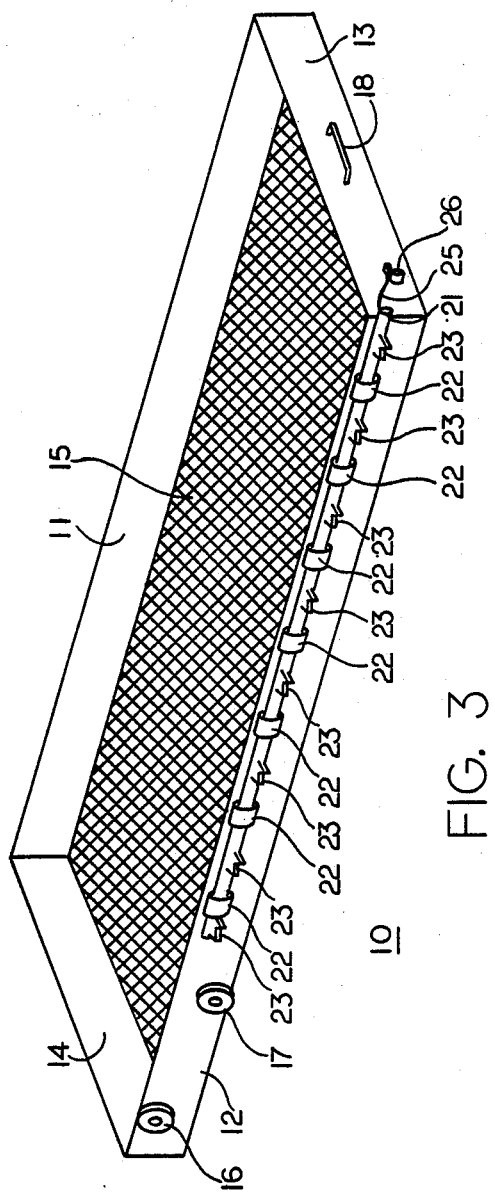
FIG. 3 is a three-quarter representational view of the tool tray without supporting receiving channels.

Referring now to FIGS. 1, 2, and 3, tool tray 10 is shown slidably installed to the underside of the flatbed of a flatbed utility vehicle 1. Tool tray 10 is generally constructed using heavy gauge metal. The rectangular frame can be constructed from either C-channel or angle iron as is shown here. The rectangular frame is constructed using right side member 11, left side member 12, front end member 13 and rear end member 14 welded together to form a rectangular frame. Rectangular bottom panel 15 is welded to the lower edge of side and end members 11, 12, 13 and 14.

The rectangular frame is slidably engaged with a pair of receiving channels, here right receiving channel 19 and left receiving channel 20. Rod 21 is rotatably attached, via attachment sleeves 22, to left side member 12. A plurality of stop dogs 23, each having a V-shaped notch, are radially attached and aligned along rod 21. An actuator handle 25 is radially attached to an extending end of rod 21 and is provided to facilitate engaging and disengaging V-shaped stop dogs 23 with a suitable retaining dog. Handle stop 26 is attached to front end member 13 and disposed to provide a stop for actuator handle 25, thereby limiting a clockwise rotation of rod 21. Stop dogs 23 serve as the counterclockwise rotation limiter.

Figures 5, 6:
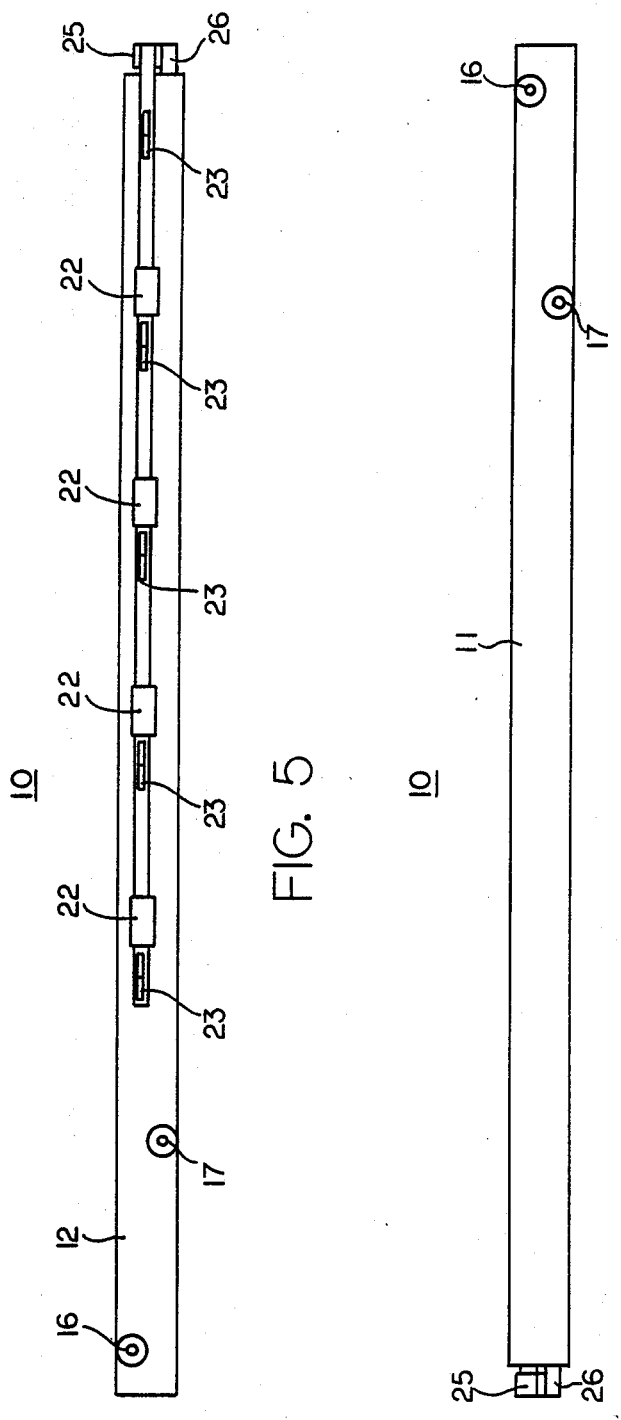
FIG. 5 is a left side plan view of the tool tray.
FIG. 6 is a right side plan view of the tool tray.

Referring now to FIG. 3, front and rear rollers 17 and 16 are shown attached toward the back end of left side member 12. A pair of back rollers 16 are attached on respective side members 11 and 12 toward the upper edge of the side members. While only one back roller 16 is shown here, it should be noted that right side member 11 has an identical back roller attached thereto as is shown in FIG. 6. Similarly, a pair of front rollers 17 are attached to respect side members toward their lower edges. Front rollers 17 act as the fulcrum load bearing points for tool tray 10 while back rollers 16 serve and the cantilever points. A pull handle 18 is provided and attached to front end member 13 to provide a convenient hand hold for pushing and pulling the tray.

Figure 4:
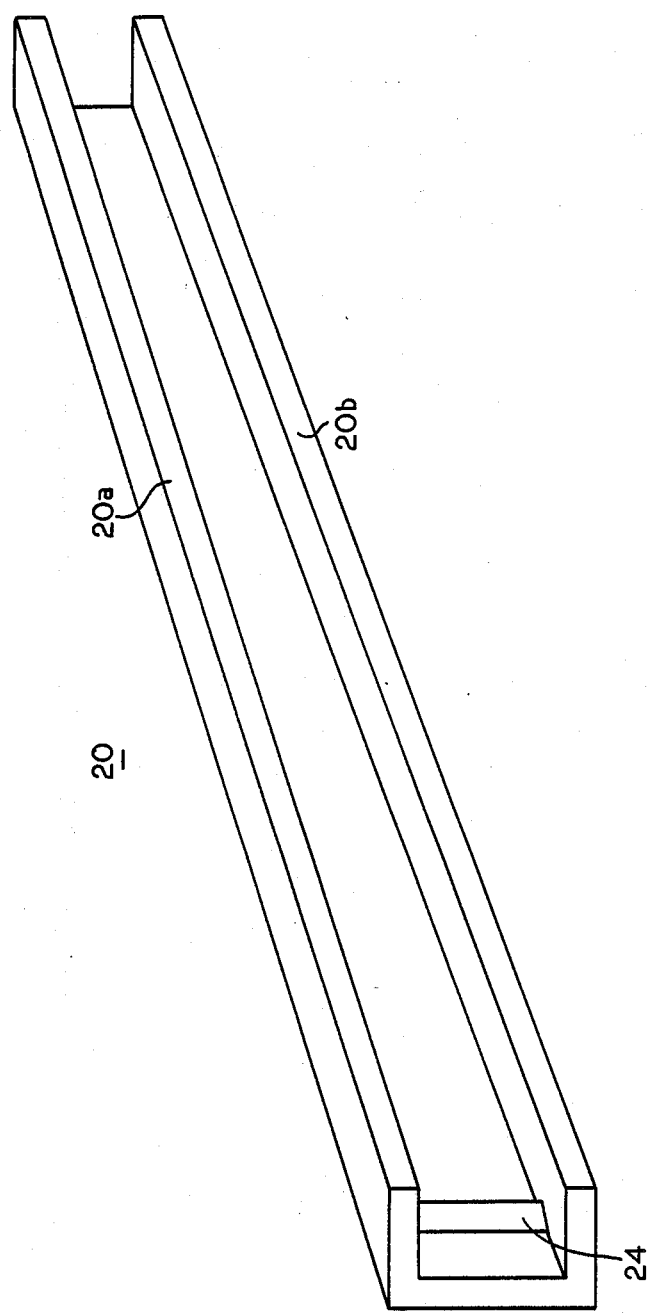
FIG. 4 is a three-quarter representational view of the left receiving channel.

FIG. 4 shows left receiving channel 20 having upper and lower lips 20a and 20b. A triangular retaining dog 24 is attached toward the front end of left receiving channel 20 and is disposed to engage one of the plurality of V-shaped notches in stop dogs 23 of FIGS. 1, 2 and 3. Right receiving channel 19, which is shown in FIGS. 1 and 2, is identical to left receiving channel 20. Receiving channels 19 and 20 can be either welded or bolted to the underside of the flatbed in parallel spaced relation. It should be noted that some flatbeds have parallel C-channel frame members which are capable of withstanding the point loads incurred in this particular application. In this particular instance, receiving channels 19 and 20 can be omitted.

Advantageously, both the right and left retaining dogs are removably attached, via bolts or the like, and provide a roller stop which prevents the tray from being accidentally removed during use. If it is desired to remove the tray, the triangular retaining dogs are unbolted and the tray slid out.

FIGS. 5 and 6 show the left and right sides of tool tray 10 in plan view and serve to illustrate the preferred arrangement of individual components.

In use, tool tray 10 can be extended to any one of the plurality of positions provided by stop dogs 23. Tool tray 10 can be partially extended during transit which is especially useful when carrying heavy equipment such as compressors and the like.

While there is shown and described the present preferred embodiment of the invention, it is to be distinctly understood that this invention is not limited hereto but may be variously embodied to practice within the scope of the following claims.

I claim:

1. A tool tray for storing tools on the underside of the bed of a utility truck, said truck including a pair of longitudinal frame members, said members forming receiving channels having an upper lip and a lower lip, and being abutted in a parallel spaced relation to the underside of the bed, which comprises:

a rectangular frame having first and second length defining side members and front and back width defining end members, wherein said side and end members each have an upper edge and lower edge;

a rectangular bottom panel having a similar length and width to that of said rectangular frame and being attached to said frame along the lower edges of said side and end members;

roller means being attached to said rectangular frame and in constant slidable engagement with said upper and lower lips of said receiving channels and bearing against said lower lip, in the manner of a fulcrum and against said upper lip to allow cantilever support for said tray for slidably supporting said rectangular frame in said receiving channels; and engagement means cooperatively attached between said rectangular frame and said receiving channels for holding said rectangular frame in any one of a plurality of preselected displacement positions with respect to said receiving channels, said plurality of displacement positions including an open position, a closed position, and positions therebetween.

2. The tool tray of claim 1 wherein said roller means comprises:

a first pair of rollers, one being attached to said first side member and one being attached to said second side member, where both rollers of said first pair are disposed on their respective side members toward an end of the respective side member directly adjacent said back end member and further toward the upper edges of their respective side members such that a portion of each roller of the first pair rotatably engages the upper lip of an adjacent receiving channel; and a second pair of rollers, one being attached to said first side member and one being attached to said second side member, where both rollers of said second pair are disposed on their respective side members in front of the rollers of said first pair and further toward the lower edges of their respective side members such that a portion of each roller of the second pair rotatably engages the lower lip of an adjacent receiving channel.

3. The tool tray of claim 2 wherein the engagement means comprises:

a rod being rotatably attached substantially along the length of said first side member and having an actuator handle extending radially therefrom and disposed in front of said front end member for imparting a rotation to the rod;

a plurality of dogs, each having a notch, being radially aligned and attached to said rod; and a retaining dog being attached to the receiving channel adjacent said first side member and further being disposed to selectively engage one of any of the plurality of stop dogs.

4. The tool tray of claim 1 wherein the engagement means comprises:

a rod being rotatably attached substantially along the length of said first side member and having an actuator handle extending radially therefrom and disposed in front of said front end member for imparting a rotation to the rod;

a plurality of stop dogs, each having a notch, being radially aligned and attached to said rod; and a retaining dog being attached to the receiving channel adjacent said first side member and further being disposed to selectively engage one of any of the plurality of stop dogs.

* * * * *